United States Patent
Khader et al.

(10) Patent No.: US 8,682,945 B2
(45) Date of Patent: Mar. 25, 2014

(54) METHOD AND SYSTEM FOR AUTHORING MULTIPLE APPLICATION VERSIONS BASED ON AUDIENCE QUALIFIERS

(75) Inventors: Aslam Khader, Beaverton, OR (US); Jeffrey Todd Harper, Tualatin, OR (US); Halstead Winship York, Portland, OR (US)

(73) Assignee: Ensequence, Inc., Portland, OR (US)

( * ) Notice: Subject to any disclaimer, the term of this patent is extended or adjusted under 35 U.S.C. 154(b) by 173 days.

(21) Appl. No.: 12/873,198

(22) Filed: Aug. 31, 2010

(65) Prior Publication Data

US 2011/0022637 A1     Jan. 27, 2011

Related U.S. Application Data

(63) Continuation-in-part of application No. 12/509,363, filed on Jul. 24, 2009.

(51) Int. Cl.
*G06F 17/00* (2006.01)
*G06F 17/30* (2006.01)

(52) U.S. Cl.
USPC .......................................................... 707/899

(58) Field of Classification Search
CPC ....... G06F 9/544; G06F 9/4416; G06F 21/57; G06F 21/577; G06F 21/575; G06F 21/64; G06F 21/00; G06F 21/51; G06F 21/604; G06F 21/606; G06F 21/645; G06F 9/445; G06F 11/3672; G06F 17/00; G06F 21/105; G06F 21/31
USPC ........ 707/899; 725/61, 110, 112, 42, 135, 34, 725/46; 713/176, 189, 1; 726/23; 705/46
See application file for complete search history.

(56) References Cited

U.S. PATENT DOCUMENTS

| | | | |
|---|---|---|---|
| 5,295,256 | A | 3/1994 | Bapat |
| 5,297,279 | A | 3/1994 | Bannon et al. |
| 5,335,320 | A | 8/1994 | Iwata et al. |
| 5,404,488 | A | 4/1995 | Kerrigan et al. |
| 5,625,693 | A | 4/1997 | Rohatgi et al. |
| 5,675,752 | A | 10/1997 | Scott et al. |
| 5,729,748 | A | 3/1998 | Robbins et al. |

(Continued)

FOREIGN PATENT DOCUMENTS

| | | |
|---|---|---|
| GB | 2375631 B | 12/2004 |
| WO | 02071212 A1 | 9/2002 |

OTHER PUBLICATIONS

Aho, Sethi and Ullman, "Compilers: Principles, Techniques, and Tools," 1986, Addison-Wesley, ISBN 0-201-10088-6, Chapter 6.

(Continued)

*Primary Examiner* — Yicun Wu
(74) *Attorney, Agent, or Firm* — Kristine Elizabeth Matthews

(57) ABSTRACT

A computer system is used to create and distribute applications. An audience qualifier and a set of categories corresponding to the audience qualifier are selected. A master application template is selected. The master application template may be pre-certified. For each of the selected categories, an application instance is created from the master application template, where the modifications to the master application template for each category are determined at least in part by the characteristics of the category. Metadata describing the audience qualifier and category are associated with each application instance. The application instances may be certified. The application instances are distributed in accordance with the metadata.

17 Claims, 8 Drawing Sheets

(56) References Cited

U.S. PATENT DOCUMENTS

| | | | |
|---|---|---|---|
| 5,754,858 | A | 5/1998 | Broman et al. |
| 5,943,497 | A | 8/1999 | Bohrer et al. |
| 5,978,579 | A | 11/1999 | Buxton et al. |
| 6,026,237 | A | 2/2000 | Berry et al. |
| 6,072,953 | A | 6/2000 | Cohen et al. |
| 6,182,279 | B1 | 1/2001 | Buxton |
| 6,237,136 | B1 | 5/2001 | Sadahiro |
| 6,269,473 | B1 | 7/2001 | Freed et al. |
| 6,427,228 | B1 | 7/2002 | Wigger |
| 6,590,589 | B1 | 7/2003 | Sluiman et al. |
| 6,671,804 | B1 | 12/2003 | Kent |
| 6,732,331 | B1 | 5/2004 | Alexander |
| 6,775,680 | B2 | 8/2004 | Ehrman et al. |
| 6,868,427 | B2 | 3/2005 | Herzog et al. |
| 6,931,623 | B2 | 8/2005 | Vermeire et al. |
| 6,966,002 | B1 | 11/2005 | Torrubia-Saez |
| 6,996,566 | B1 | 2/2006 | George et al. |
| 6,996,843 | B1* | 2/2006 | Moran ............................ 726/23 |
| 7,000,185 | B1 | 2/2006 | Murren et al. |
| 7,047,318 | B1 | 5/2006 | Svedloff |
| 7,096,463 | B2 | 8/2006 | Pisupati et al. |
| 7,117,370 | B2 | 10/2006 | Khan et al. |
| 7,155,705 | B1 | 12/2006 | Hershberg et al. |
| 7,165,076 | B2* | 1/2007 | Bentley ............................ 1/1 |
| 7,181,694 | B2 | 2/2007 | Reiss et al. |
| 7,219,332 | B2 | 5/2007 | Gouge et al. |
| 7,228,537 | B2 | 6/2007 | Murray |
| 7,237,227 | B2 | 6/2007 | Lei et al. |
| 7,287,229 | B2 | 10/2007 | Forkner et al. |
| 7,360,097 | B2* | 4/2008 | Rothstein ...................... 713/189 |
| 7,412,687 | B2 | 8/2008 | Goodwin et al. |
| 7,496,757 | B2* | 2/2009 | Abbott et al. ................. 713/176 |
| 7,548,946 | B1 | 6/2009 | Saulpaugh et al. |
| 7,631,004 | B2 | 12/2009 | Skibo et al. |
| 7,644,262 | B1* | 1/2010 | Bromley et al. .................. 713/1 |
| 7,694,117 | B2* | 4/2010 | Kilian et al. ...................... 713/1 |
| 7,747,942 | B2 | 6/2010 | Dasari et al. |
| 7,779,389 | B2* | 8/2010 | Markov et al. ................ 717/121 |
| 7,793,087 | B2* | 9/2010 | Zenz et al. ........................ 713/1 |
| 8,229,984 | B2 | 7/2012 | Khader et al. |
| 8,307,020 | B2 | 11/2012 | Khader et al. |
| 2002/0057286 | A1 | 5/2002 | Markel et al. |
| 2002/0059278 | A1 | 5/2002 | Bailey et al. |
| 2002/0104069 | A1 | 8/2002 | Gouge et al. |
| 2002/0199187 | A1 | 12/2002 | Gissin et al. |
| 2003/0097657 | A1* | 5/2003 | Zhou et al. ...................... 725/46 |
| 2003/0101451 | A1 | 5/2003 | Bentolila et al. |
| 2003/0158760 | A1 | 8/2003 | Kannenberg |
| 2004/0216086 | A1 | 10/2004 | Bau |
| 2005/0028156 | A1 | 2/2005 | Hammond et al. |
| 2005/0081061 | A1 | 4/2005 | Acott et al. |
| 2005/0138558 | A1 | 6/2005 | Duevel et al. |
| 2005/0268280 | A1 | 12/2005 | Fildebrandt |
| 2006/0053390 | A1 | 3/2006 | Gariepy-Viles |
| 2006/0080329 | A1 | 4/2006 | Skibo et al. |
| 2006/0143148 | A1 | 6/2006 | Degtyar et al. |
| 2007/0038781 | A1 | 2/2007 | Joung et al. |
| 2007/0107016 | A1* | 5/2007 | Angel et al. ..................... 725/61 |
| 2007/0220583 | A1* | 9/2007 | Bailey et al. .................. 725/135 |
| 2008/0059282 | A1* | 3/2008 | Vallier et al. .................... 705/10 |
| 2008/0115104 | A1 | 5/2008 | Quinn |
| 2009/0049430 | A1 | 2/2009 | Pai et al. |
| 2009/0089746 | A1 | 4/2009 | Rigolet |
| 2009/0094632 | A1 | 4/2009 | Newnam et al. |
| 2009/0187939 | A1* | 7/2009 | Lajoie ............................. 725/34 |
| 2009/0216619 | A1 | 8/2009 | Tavernier |
| 2009/0299857 | A1 | 12/2009 | Brubaker |

OTHER PUBLICATIONS

Ardito, Costabile and Lanzilotti, "Enhancing User Experience while Gaming in Archaeological Parks with Cellular Phones," Proceedings of the 8th International Conference on Interaction Design and Children, Jun. 2009, Como, Italy, ACM, New York, NY, pp. 270-271.

Third Party Peer Review of Ardito et al., "Enhancing User Experience while Gaming in Archaeological Parks with Cellular Phones," submitted for U.S. Appl. No. 12/776,326, 2 pages.

"What's New in NetBeans IDE 4.0," Published online at <www.netbeans.org/community/releases/40/whats-new-40.html>, archived on Dec. 14, 2004 at <http://web.archive.org/web/20041214145621/http://www.netbeans.org/community/releases/40/whats-new-40.html> (6 pages).

Third Party Peer Review of "What's New in NetBeans IDE 4.0," submitted for U.S. Appl. No. 12/509,397, 2 pages.

Third Party Peer Review of 20080115104, submitted for U.S. Appl. No. 12/509,383, 2 pages.

USPTO Office Action—U.S. Appl. No. 12/509,363—Notification Date Mar. 1, 2013.

USPTO Office Action—U.S. Appl. No. 12/509,363—Notification Date Aug. 17, 2011.

USPTO Office Action—U.S. Appl. No. 12/509,363—Notification Date Jul. 19, 2013.

USPTO Office Action—U.S. Appl. No. 12/509,363—Notification Date Jan. 10, 2012.

USPTO Office Action—U.S. Appl. No. 12/509,363—Notification Date Apr. 26, 2012.

USPTO Office Action—U.S. Appl. No. 12/509,383—Notification Date Jul. 8, 2013.

USPTO Office Action—U.S. Appl. No. 12/509,383—Notification Date Apr. 26, 2012.

USPTO Office Action—U.S. Appl. No. 12/509,383—Notification Date Nov. 8, 2012.

USPTO Office Action—U.S. Appl. No. 12/509,397—Notification Date Sep. 28, 2011.

USPTO Office Action—U.S. Appl. No. 12/509,397—Notification Date May 14, 2013.

USPTO Office Action—U.S. Appl. No. 12/509,397—Notification Date Apr. 30, 2012.

USPTO Office Action—U.S. Appl. No. 12/509,397—Notification Date Dec. 7, 2012.

USPTO Office Action—U.S. Appl. No. 12/767,705—Notification Date Oct. 12, 2011.

USPTO Office Action—U.S. Appl. No. 12/767,705—Notification Date Mar. 27, 2012.

USPTO Office Action—U.S. Appl. No. 12/776,326—Notification Date Sep. 21, 2011.

USPTO Office Action—U.S. Appl. No. 12/509,397—Notification Date Sep. 3, 2013.

USPTO Office Action—U.S. Appl. No. 12/873,178—Notification Date Sep. 23, 2013.

USPTO Office Action—U.S. Appl. No. 12/873,178—Notification Date Apr. 17, 2013.

USPTO Office Action—U.S. Appl. No. 12/873,178—Notification Date Sep. 27, 2011.

USPTO Office Action—U.S. Appl. No. 12/873,178—Notification Date Mar. 26, 2012.

* cited by examiner

```
201  <?xml version="1.0" encoding="utf-8"?>
202  <template>
203    <modify-property file="page1.tvb" object="text1" property="label"
         type="string">
204      <constraint text-max-length="28"/>
205    </modify-property>
206    <modify-variable file="page1.tvb" variable="myVar" type="integer">
207      <constraint range-min="0" range-max="10"/>
208    </modify-variable>
209    <modify-property file="page1.tvb" object="text1" property="hAlign"
         type="string">
210      <constraint valid-value="left"/>
211      <constraint valid-value="middle"/>
212      <constraint valid-value="right"/>
213    </modify-property>
214    <modify-resource file="myApp.tvr" resource="imageRes1">
215      <constraint valid-extension=".png"/>
216      <constraint valid-extension=".bmp"/>
217    </modify-resource>
218    <modify-cell file="data1.tvd" table="tbl1" row="2" col="3" type="intege
219      <constraint range-min="0"/>
220    </modify-cell>
221  </template>
```

FIG. 2

METHOD AND SYSTEM FOR AUTHORING MULTIPLE APPLICATION VERSIONS BASED ON AUDIENCE QUALIFIERS

CROSS-REFERENCE TO RELATED APPLICATIONS

This application is a continuation-in-part of U.S. patent application Ser. No. 12/509,363, filed Jul. 24, 2009, entitled "METHOD FOR APPLICATION AUTHORING EMPLOYING A PRE-CERTIFIED MASTER APPLICATION TEMPLATE", the disclosure of which is herein incorporated by reference.

FIELD OF THE INVENTION

This invention relates generally to the modification of an application program to produce an upgraded version of the program, more specifically to the authoring and distribution of multiple versions of a program based upon audience qualifiers.

BACKGROUND OF THE INVENTION

The digital revolution has come to television. With the advent of digitally-encoded television, simple analog television (TV) receivers have been superseded by digital receivers capable of receiving and demodulating electrical signals, then extracting and decoding the compressed video and audio data streams mandated by the Motion Picture Experts Group (MPEG) encoding standards that form the basis for the Advanced Television Systems Committee digital television broadcast standard in the United States. These integrated receiver/decoder (IRD) devices contain analog and digital processing circuitry that is controlled by a central processing unit (CPU). IRDs also contain static and dynamic memory stores, interfaces, and a full complement of features that serve to enable a broad range of computational processing, including the execution of resident or downloaded applications software. When executing such applications, the IRD can generate graphics content that is overlaid onto the video content for display on an external television screen. Newer televisions incorporate the functions of the IRD, making them useful computation platforms capable of executing downloaded applications. More sophisticated IRDs may incorporate disc drive storage subsystems. These personal video recorders (PVRs) are capable of storing and playing back audio/video content.

A parallel body of work has aimed at developing standardized software execution environments that can enable the widespread deployment of interactive applications within the television broadcast infrastructure. This work has been complicated in the past by the wide variety of hardware and software deployed in IRDs, particularly set-top boxes (STBs) developed for the decoding and presentation of signals in cable TV distribution systems. The effort to develop a common Multimedia Home Platform (MHP) for consumer electronic devices led to the development of a Java-based standard for interactivity in the cable television realm, the Open Cable Application Platform (OCAP) now called tru2way. More recently, a separate standardization effort has produced the Enhanced Television Binary Interchange Format (ETV-BIF) standard for less-capable cable platforms.

The production and distribution of television content has historically been supported through the incorporation of advertising content into the broadcast stream. Advertisers pay for the right to broadcast advertising content at selected times in pairing with selected broadcast content, the cost to the advertiser reflecting the anticipated or potential audience that may view the advertisement. The selection of available time slots, or 'avails', by an advertiser is based in part of the expected target audience for the video content being shown on the given channel or service. An advertiser of products of particular interest to young people may prefer avails within content expected to interest those same young people.

Advertisers and broadcasters have developed a number of metrics or categories that can be used to describe a person or group of people who might consume a product or view a broadcast. Each audience qualifier (AQ) defines a qualitative or quantitative feature of a consumer, and divides the universe of consumers into a few categories. For example, 'gender' is an audience qualifier with two values, 'male' and 'female'. Another quantitative qualifier is 'age', which may be categorized into a series of ranges, for example 'under 12', '12 to 17', '18 to 34', '35 to 59', '60 and older'. A valid and useful audience qualifier is one for which two or more categories can be defined. Table 1 illustrates these audience qualifiers and associated categories:

TABLE 1

Audience Qualifiers and Associated Categories

| Audience Qualifier (AQ) | Gender | Age |
|---|---|---|
| Categories within AQ | Male | Under 12 |
| | Female | 12 to 17 |
| | | 18 to 34 |
| | | 35 to 59 |
| | | 60 and older |

Content creators, content distributers, and advertisers use AQs to characterize content and to quantify viewership. The Nielsen ratings company associates television viewership patterns with the AQs of each measured viewer or home. An advertiser will preferably run ads that appeal to children during Saturday morning cartoons, and ads that appeal to sports fans during Sunday afternoon football games.

When television content is distributed through terrestrial broadcast, networks distribute a common content stream to all viewers, and rely on aggregate statistics to predict the characteristics of the viewing audience for given video content.

What is required is a system that enables the creation and distribution of multiple versions of an application based on audience qualifiers.

SUMMARY OF THE INVENTION

The present invention provides a method and system for creating and distributing multiple versions of an application by selecting an audience qualifier; selecting at least two categories for the audience qualifier; selecting a master application template; creating for each selected category at least one application instance from the master application template, where the appearance and behavior of the application instance are determined at least in part by the characteristics of the category; associating application instance metadata with each application instance specifying the audience qualifier and the category corresponding to the application instance; and distributing each application instance in accordance with the associated application instance metadata.

In a further embodiment of the present invention, each application instance is submitted for certification prior to distribution.

In a further embodiment of the present invention, the master application template is a certified master application template and each application instance is certified by virtue of the certification of the certified master application template.

BRIEF DESCRIPTION OF THE DRAWINGS

The preferred and alternative embodiments of the present invention are described in detail below with reference to the following drawings.

FIG. 2 depicts an example of template metadata.

DETAILED DESCRIPTION OF THE INVENTION

Figure 1:
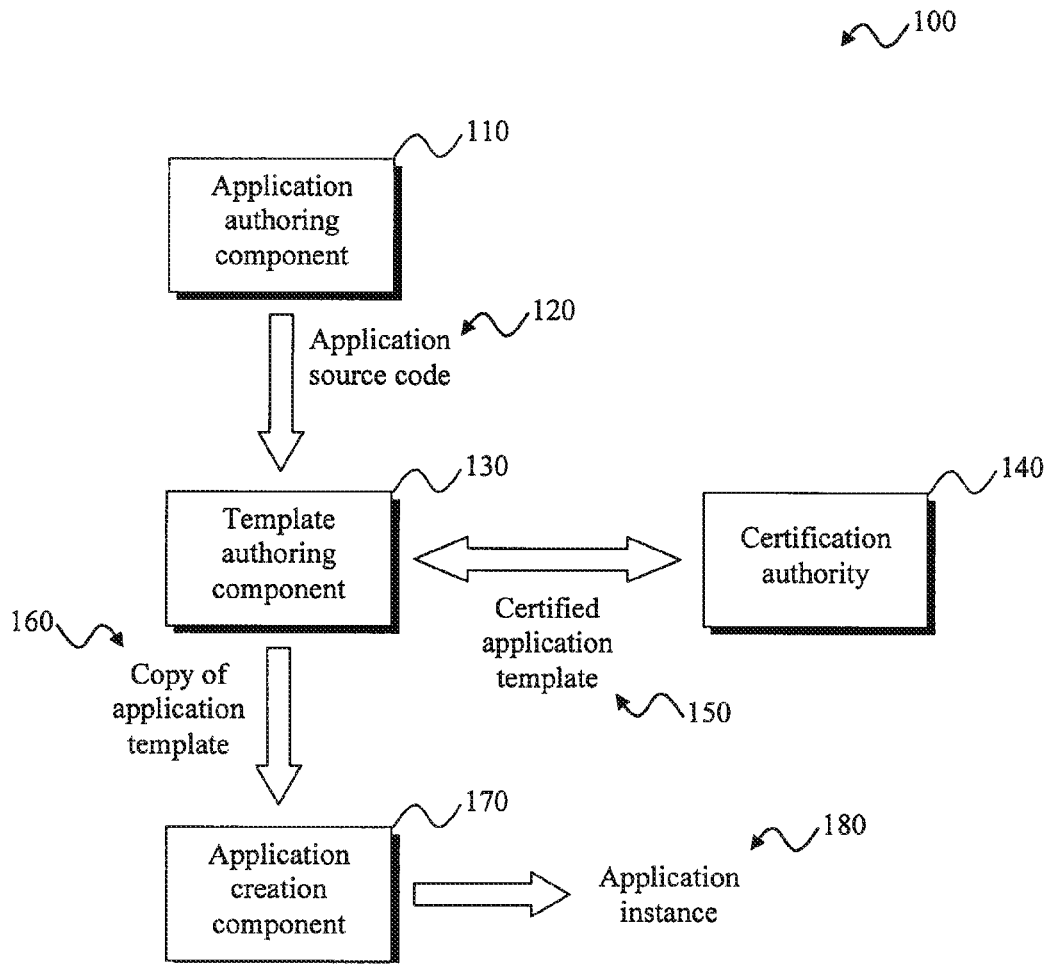
FIG. 1 depicts an exemplary system for creating a master application template.

By way of overview, embodiments of the present invention provide a system and methods for authoring and distributing multiple versions of an application based on audience qualifiers.

As used herein, the term "application" is intended to refer generally to an experience of appearance and behavior engendered by a computing platform. An application is commonly authored in a source code language using an authoring environment, the source code being used to generate an executable version of the application for deployment to a computing platform to realize the desired experience.

As used herein, the term "executable application" is intended to refer to a body of digital information comprising executable instructions and data that when processed on a suitable computing platform yields appearance and behavior as intended by the creator of the application. An executable application may be encoded using native CPU instructions, interpreted byte codes, declarative data structures, or any combination of such encodings. An executable application may respond to external events by appropriate modification of appearance and behavior, as specified by the code and data comprising the executable application.

As used herein, the term "application representation" is intended to refer to a body of digital information that defines an application. The application representation may be one or more source code files, an in-memory representation of the application structure and function, or a database representation of the application structure and function. An application representation may be used to generate an executable version of the application.

As used herein, the term "metadata" is intended to refer to human-readable or binary content which is not part of an application representation or executable application, but which refers to attributes of an application representation or modifications that may be made to such attributes, or characterizes an executable application. Template metadata describe the allowable modifications of a template. Application instance metadata describe the audience qualifier and category associated with an application instance.

As used herein, the term "template" is intended to refer to an application representation and associated template metadata. The associated template metadata define allowable modifications to the application representation. The application representation for a template can be modified in accordance with template metadata associated with the application representation. The modified application representation may be used to generate an executable application. The phrases "application template" and "master application template" as used herein are synonymous with the term "template".

As used herein, the terms "certify" and "certification" are intended to refer to the process of validating the appearance and/or behavior of an executable application against a specified set of requirements, to determine that the application meets each and all of the specified requirements.

As used herein, the phrase "generate an application" is intended to refer to the process of converting an application representation into an executable application.

As used herein, the term "resource" is intended to refer to a body of binary data, exclusive of the source code or executable instructions of an application, which is used during the execution of the application to control the appearance or behavior of the application.

As used herein, the phrase "audience qualifier" is intended to refer to a qualitative or quantitative attribute of a member of an audience that can be unambiguously characterized for each audience member.

The term "category" as used herein in reference to an audience qualifier is intended to refer to a value, a set of values, or a range of values of the attribute of the audience qualifier. To be useful, an audience qualifier must have two or more categories, but the set of categories for an audience qualifier may not be inclusive of all possible members of the audience. The attribute of an audience qualifier may be a singular feature of an audience member, such as gender or age; or may be compound, comprising a combination of two or more singular features of an audience member, such as a combination of education and income. For a compound audience qualifier, the "category" designation comprises the combination of a value, set of values, or range of values for each of the singular features.

The term "select" as used herein with respect to an audience qualifier or a set of categories is intended to refer to the choice from among a predefined set of qualifiers or sets of categories, or the de novo definition of an audience qualifier or a set of categories corresponding to an audience qualifier. A set of categories is comprehensive if any audience member can be unambiguously associated with one and only one category. A set of categories is non-comprehensive if at least one potential audience member cannot be unambiguously associated with any category. Preferentially, the set of categories for an audience qualifier is comprehensive. A non-comprehensive set of categories can be made comprehensive by adding an additional 'other' category.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the scope or spirit of the claimed subject matter.

In many circumstances, a need exists to deploy multiple versions of an application that vary only slightly in their appearance and behavior. Templates have been one mechanism for simplifying the production of such variant applications. A template provides a basic framework, within which minor variations such as location, size and color of graphical elements can be modified to control appearance. An exemplary case where the use of templates is appropriate is in the production of standard-form interactive applications intended for broadcast with advertising content.

In some distribution systems such as cable or Internet Protocol television (IPTV), a distributer may supply two or more versions of content, and the selection of which version of content goes to a given viewing point may depend on the measured or inferred characteristics of the viewer(s) at that viewing point. For instance, the user of a subscription video-on-demand (VOD) system supplied over an IPTV network may see commercials interjected into the VOD content, where the commercial content is selected based upon known characteristics of the user such as geographical location, gender or income level.

Audience qualifiers may also be used to control or influence the presentation and execution of interactive applications in a television broadcast environment. For example, if a given application offers items for sale, the choice of which items to display to a given viewer might depend on the viewer's age, gender, and income level. This presents a challenge in authoring and properly distributing such applications so that the desired application content and behavior is displayed to a given viewer.

FIG. 1 depicts the components of an exemplary system 100 for authoring multiple versions of an application using a master template. An initial version of an application can be authored using an application authoring component 110. An example of a suitable application authoring component 110 is the Create™ ETV-BIF product developed by Ensequence, Inc. of Portland, Oreg. A further example of an application authoring component 110 is the TVWorks™ XML Development Kit developed by TV Works, LLC, of Mill Valley, Calif. In this exemplary system, the application representation is in the form of source code.

Once application source code 120 has been written, the application source code is converted into a master application template and master application template metadata are authored using a template authoring component 130. Template authoring component 130 serves to create and modify template metadata associated with the master application template. Template authoring component 130 may be any suitable text editor executing on a computer workstation, or may be a specialized editing environment configured to create and edit template metadata, for example by means of an application executing on a computer workstation or through a web services interface specialized for this purpose.

Following the authoring of the master application template, the master application template may optionally be submitted to a certification authority 140 for certification testing. The submission to the certification authority 140 may comprise the master application template content and an application generated from the master application template, for example by use of the default values of any modifiable attributes of the template. Examples of how the master application template content may be submitted to the certification authoring 140 include: (a) in the form of human-readable source code and template metadata files, (b) through a specialized application that visualizes an in-memory representation of the application representation and associated template metadata, (c) through access to a database storing the application representation and associated template metadata, or (d) by some other means that allows examination of the application representation and the allowable modifications of the representation. Certification authority 140 may certify the application, or may report problems with the certification testing. In the latter case, further modification of a master application template is performed using template authoring component 130.

The master application template can be used to create multiple application instances. When creating an application from a master application template, a copy 160 of the master application template is created, and an application authoring component 170 is used to modify the source code of the copy of the master application template within the constraints embodied in the master application template metadata. Application authoring component 170 may be any suitable text editor executing on a computer workstation, or may be a specialized editing environment configured to allow modification of the application template application representation in accordance with the requirements for modification embodied in the template metadata of the certified application template, for example by means of an application executing on a computer workstation or through a web services interface specialized for this purpose.

Once all modifications have been performed, application authoring component 170 is used to generate an executable version of the application instance 180.

A master application template comprises an application representation and associated template metadata that define the characteristics of the template. The template metadata may be incorporated into the application representation, or may be stored in a form distinct from the application representation. By way of illustration, the following description describes a set of template metadata tags suitable for a master application template, in which the application representation is source code written using the TVScript-BIF language as employed in the Create ETV-BIF application authoring product.

Briefly, TVScript-BIF is an object-oriented language for authoring declarative applications that execute on an ETV-BIF user agent. A TVScript-BIF application consists of: (a) an object hierarchy constructed from the various native objects defined by the TVScript-BIF language, (b) optional variables that contain static or dynamic values used during the execution of the application to control application appearance or behavior, (c) optional event function code that is executed in response to events, (d) optional data tables used to control application appearance or behavior, (e) optional resources used when executing the application, and (f) and optional signal and trigger data that may be sent to the application during execution. TVScript-BIF applications execute on compliant ETV-BIF user agents. The ETV-BIF binary format and the behavioral requirements for a compliant ETV-BIF user agent are defined by OpenCable specification OC-SP-ETV-BIF1.0-I04-070921 "Enhanced TV Binary Interchange Format 1.0" issued by Cable Television Laboratories Inc., Louisville, Colo., incorporated herein by reference.

The source code of a TVScript-BIF application comprises a series of human-readable files that: (a) define the hierarchy of object instances ("widgets") that make up the application, (b) declare the associated functions and variables used during the execution of the application, (c) specify the values of data tables incorporated into the application, (d) designate the source files for image and font resources used by the application, and (e) define the structure of the ETV-BIF resources to be created when generating the executable application.

In an exemplary implementation of a system for authoring a master application template from a TVScript-BIF application, template metadata are stored with the source code. The template metadata contain the specifications for how the template application source code may be modified when creating a version of the application from the template. In this exemplary implementation, the template metadata are encoded as an XML document.

FIG. 2 shows an example of the content of a template metadata file defining the allowable modifications in a TVScript-BIF application. Note that the line numbers in FIG. 2 are not part of the source content of the template metadata file but are included as reference markers for the following discussion. Furthermore, the formatting conventions illustrated in FIG. 2 are intended to clarify the structure and content of the example file.

In this illustrative example, line 201 signals that the contents of the file are compliant with the Extensible Markup Language specification, and that the content is encoded using the UTF-8 standard.

A 'template' tag at line 202 signals that this file contains a specification for the template metadata of a master application template.

A 'modify-property' tag at line 203 denotes a property of an object instance, the initial value of which may be modified. A 'modify-property' tag has: an attribute 'file' that names the source file containing the code for the declaration of the object instance whose property can be modified; an attribute 'object' that identifies the object instance within the source file whose property can be modified; an attribute 'property' that identifies the property within the object instance that can be modified; and an attribute 'type' that signals the type of the content to be provided as the value for the property. Examples of allowable content types are 'integer', 'float', and 'string'. The 'modify-property' tag at line 203 names the 'label' property of the 'text1' object instance contained in source file 'page1.tvb'. If this property is modified during the application creation process, the new content will be substituted for the original value of the named property when the application representation is modified.

The content type determines the allowable textual content that can be specified for the substitution. Example content types 'integer', 'float', and 'string' allow for different constraint models to be applied depending on whether the substitute content for the source file comprises an integer value, a real number value, or a sequence of characters, respectively. For example, the allowable textual content for an 'integer' content type is limited to string values that express an integer value, such as "12", "−365", and "0x7F3E9".

The 'modify-property' tag at line 203 contains a 'constraint' child tag at line 204. A 'constraint' tag defines restrictions on the content of the modification that can be made to the entity named in the parent tag of the 'constraint' tag. The 'constraint' tag at line 204 restricts the maximum number of characters that can be contained in the string provided to substitute for the 'label' property of the 'text1' object instance.

A 'modify-variable' tag at line 206 denotes a variable whose initial value may be modified. A 'modify-variable' tag has attribute 'file' that names the source file containing the code for the declaration of the variable whose initial value can be modified; attribute 'variable' that names the variable that can be modified; and attribute 'type' that signals the type of the content to be supplied as the value for the variable. The 'modify-variable' tag at line 206 names the integer variable 'myVar' declared in source file 'page1.tvb', and specifies a replacement value of type integer.

The 'modify-variable' tag at line 206 contains a 'constraint' tag at line 207. The 'constraint' tag at line 207 contains attributes 'range-min' and 'range-max' that specify a range of valid integer values that can be substituted for the initial value of the 'myVar' variable, in this case the range from 0 to 10 inclusive.

A second 'modify-property' tag appears at line 209, naming the 'hAlign' property of the 'text1' object instance contained in source file 'page1.tvb'. This tag contains three child 'constraint' tags at lines 210, 211, and 212. These 'constraint' tags list valid string values that may be substituted for the initial value of the 'hAlign' property. If a modification tag contains multiple 'constraint' tags, by default the substitution value must satisfy at least one of the constraints.

Other tags (not shown) can be used to modify the logical implications of one or more constraints. For example, a 'not' constraint containment tag can contain a constraint that must not be satisfied for the 'not' constraint to be satisfied. Logical combinations of constraints can be achieved by the use of 'and' and 'or' constraint containment tags that carry the corresponding Boolean logic implications. An 'and' tag can contain one or more 'constraint', 'not', 'and' and 'or' tags, all of which must be satisfied for the 'and' to be satisfied. An 'or' tag can contain one or more 'constraint', 'not', 'and' and 'or' tags, any of which must be satisfied for the 'or' to be satisfied.

A 'modify-resource' tag at line 214 signals a resource whose source property may be modified. In a TVScript-BIF application, resources are referenced through unique identifiers, each identifier being associated with a URI that defines the source file from which the resource is generated. A 'modify-resource' tag has attribute 'file' that names the source file containing the declaration of the resource identifier, and attribute 'resource' that names the resource identifier whose source property is to be modified.

The 'modify-resource' tag at line 214 contains two child 'constraint' tags at lines 215 and 216. These 'constraint' tags contain 'valid-extension' attributes that define allowable file extensions for a URI that is specified as the new source for the resource named in the 'modify-resource' tag.

A 'modify-cell' tag at line 218 denotes a cell within a data table, that is, a given row and column location within the data table, the value of which may be modified. A 'modify-cell' tag has attribute 'file' that names the source file containing the code for the data table, attribute 'table' that names the data table within the source file, attribute 'row' that signals the row within the table containing the cell, attribute 'col' that signals the column within the table containing the cell, and attribute 'type' that signals the type of the content to be supplied as the value for the data table cell.

The 'modify-cell' tag at line 218 contains a 'constraint' tag at line 219 that specifies a range of valid values that can be substituted for the initial value of the cell at row 2, column 3 of data table 'tb11' in file 'data1.tvd'. The 'constraint' tag at line 219 specifies only a minimum value for the range. This signals that the range of valid values is any value greater than or equal to the minimum value, which in the example is zero.

The specific tags depicted in FIG. 2 are intended to be a representative but not limiting example of the types of modifications and constraints that might be specified in template application template metadata. For example, a 'constraint' tag that specified only a 'range-max' attribute would define a range that extended to any value less than or equal to the maximum value. For real values, ranges might be defined inclusive or exclusive of the end points. For string values, a constraint might list a regular expression that the replacement value must match. Other types of allowable modifications and allowable constraints will be evident to one skilled in the art.

Figure 3:
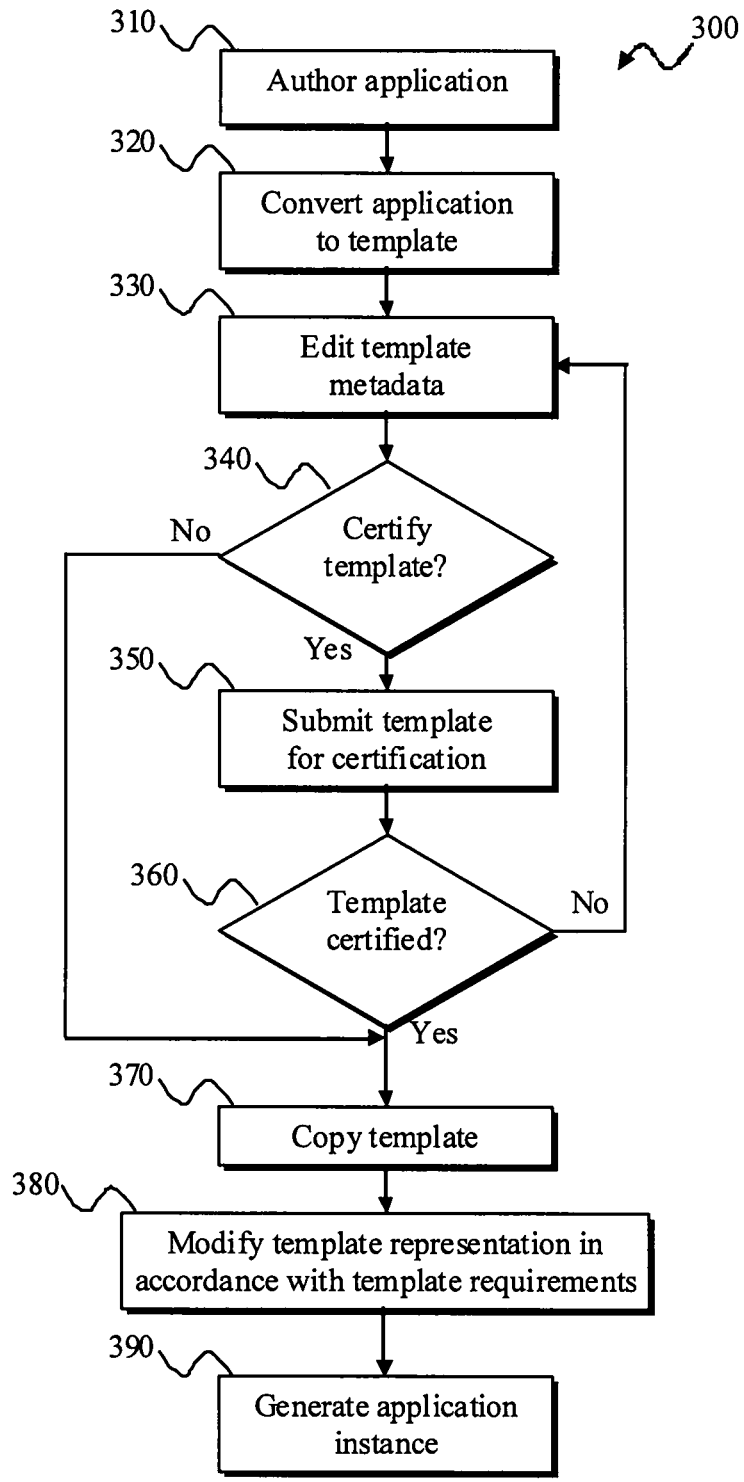
FIG. 3 depicts a flowchart delineating the steps of an exemplary method of creating an application from a master application template.

The presence of template metadata stipulating allowable modifications and associated constraints on those modifications characterizes a master application template. Therefore, the process of authoring a template consists of creating the template metadata defining the set of modifications and associated constraints that are allowable when modifying the original application representation to create a new application based on the template. Attention is now directed to FIG. 3, which depicts a flowchart of an exemplary method of creating and utilizing a master application template to generate an application instance.

At a step 310, an application is authored. This step may be undertaken using any application authoring environment known in the art, the result being an application representation that defines the application appearance and behavior.

At a further step 320, the application is converted into a master application template by the addition of template metadata to the application representation. In the exemplary implementation described above with reference to FIG. 2, the application representation comprises one or more source code files in human-readable format, while the template metadata is stored in a separate XML document. In an alternative implementation, the application representation may be generated by creating an in-memory representation of the application structure and function, for example in the form of an object or a set of objects that correspond to the objects, properties, functions, and other elements of the executable application. This in-memory representation could be created by parsing source code, or by decompiling the contents of an executable application. In this alternative embodiment, the template metadata could be stored in an XML document associated with the original source code or the executable application, or the application representation could be serialized out to one or more disk files and the template metadata stored in an XML document associated with the serialized application representation. In yet a further alternative embodiment, the application representation could comprise a series of objects that correspond to the elements of the executable application, and the objects could be stored in a relational database. In this yet further alternative embodiment, the template metadata could be stored in the relational database in association with the objects comprising the application representation. Other forms of representation and storage will be evident to those skilled in the art.

At a further step 330, the master application template metadata are edited. The editing process comprises the creation, modification, rearrangement, and deletion of specifications of allowable modifications to the application representation, as exemplified by the modifications described above in reference to FIG. 2. The editing process further includes the creation, modification, and deletion of constraints on the allowable modifications, as exemplified by the constraints described above in reference to FIG. 2. The editing process may be performed through a text editor, through an application interface specifically encoded to allow such editing, or by other means known in the art.

At a further step 340, a decision is made whether to certify the master application template. If the master application template is to be certified, at a further step 350 the master application template is submitted for certification. In accordance with the description above in reference to FIG. 1, the submission of an exemplary application generated from the template, along with the template metadata comprising the allowable modifications to the application representation, is made to a certification body. The certification process is described in greater detail below with reference to FIG. 4.

At a further step 360, the certification body returns a certification decision. If the master application template is not certified, further editing is performed at a step 330. If the master application template is certified, the certified master application template is available for use in creating a certified application.

Following the optional certification of the master application template, at a further step 370, a copy of the master application template is made, and an application representation formed therefrom, for use in creating a new application.

At a further step 380, the application representation of the copy of the master application template is modified in accordance with the template metadata contained in the master application template. Only those aspects of the application representation specified in the template metadata may be modified, and each such modification must be made in accordance with any constraints specified for the modification in the template metadata.

Once all desired modifications have been performed, at a further step 390 the modified application representation is used to generate an application instance. If the master application template has been certified, the resulting application can be denoted as certified without further analysis or testing by the certification body.

The operation performed at step 380 of modifying the application representation in accordance with the template metadata contained in the master application template may be performed using any suitable editing environment known in the prior art. For example, U.S. Pat. No. 6,590,589 describes one such system that would be adaptable to the performance of source code modification. Similarly, the on-Q Publish™ software product marketed by Ensequence, Inc., provides a suitable editing environment for this purpose.

Figure 4:
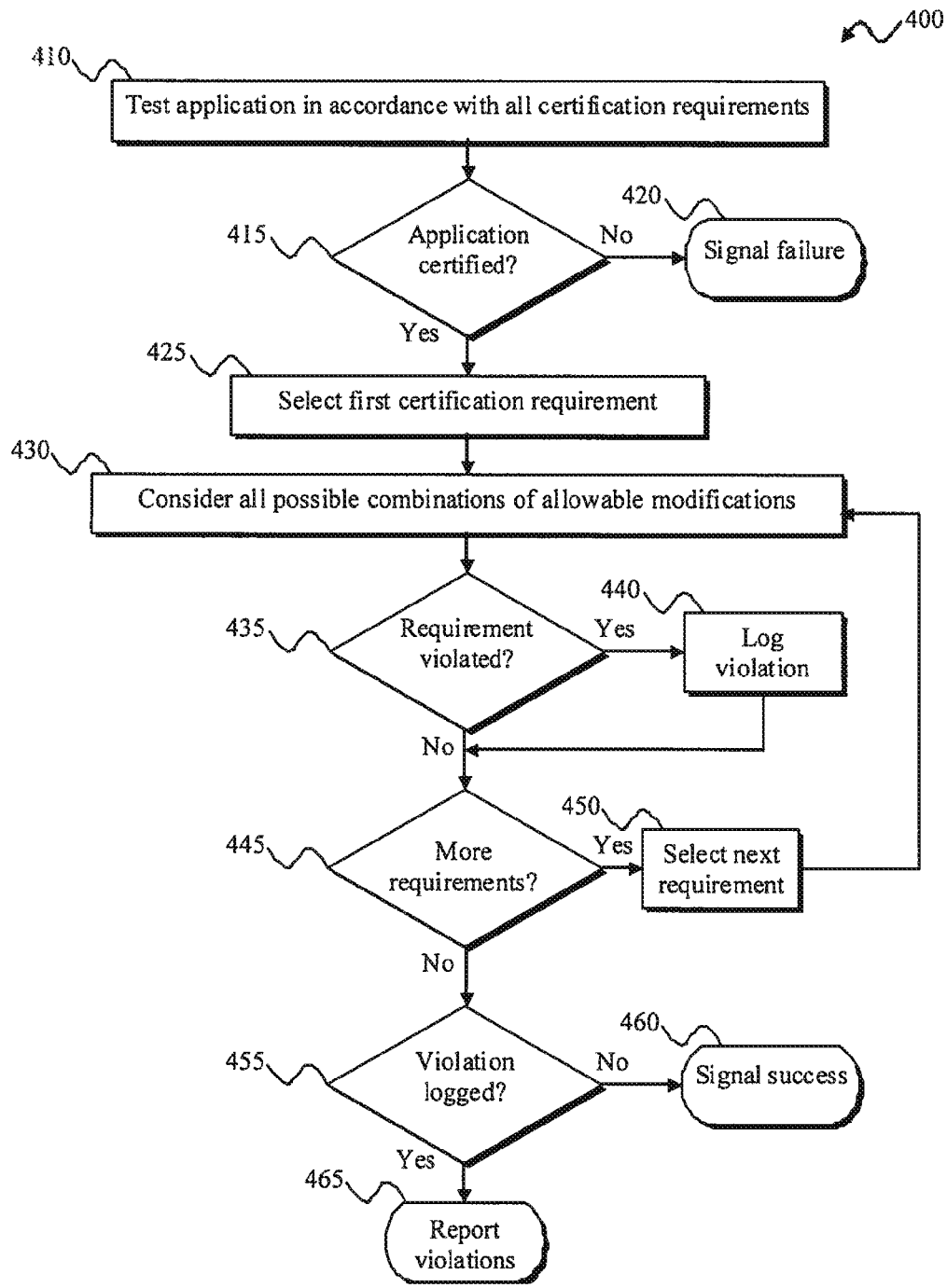
FIG. 4 depicts a flowchart delineating the steps of an exemplary method of certifying a master application template.

Attention is now directed to FIG. 4, which depicts a flowchart of an exemplary process for certifying a master application template. At a step 410, an application submitted with the master application template is certified according to the conventional certification process for an application. At a step 415, the status of the application certification is determined. If the application failed certification, at a step 420 the certification failure is reported and the process terminates. If the application passed certification, at a step 425 the first certification requirement is selected. At a step 430, the appearance and behavior of the application for all allowable values of all allowable modifications are compared against the selected certification requirement. At a step 435, a determination is made if any of the allowable combinations of modifications violates the selected certification requirement. If the certification requirement is violated, at a step 440 the violation is logged. At a step 445, a check is made if at least one more certification requirement remains to be considered. If at least one certification requirement remains to be considered, at a step 450 the next certification requirement is selected, and step 430 is repeated. If no more certification requirements remain to be considered, at a step 455 a test is made if any certification requirement violation was logged. If no violation was logged, at a step 460 certification success is reported and the process terminates. If at least one violation was logged, at a step 465 all logged certification requirement violations are reported and the process terminates.

Figure 5:
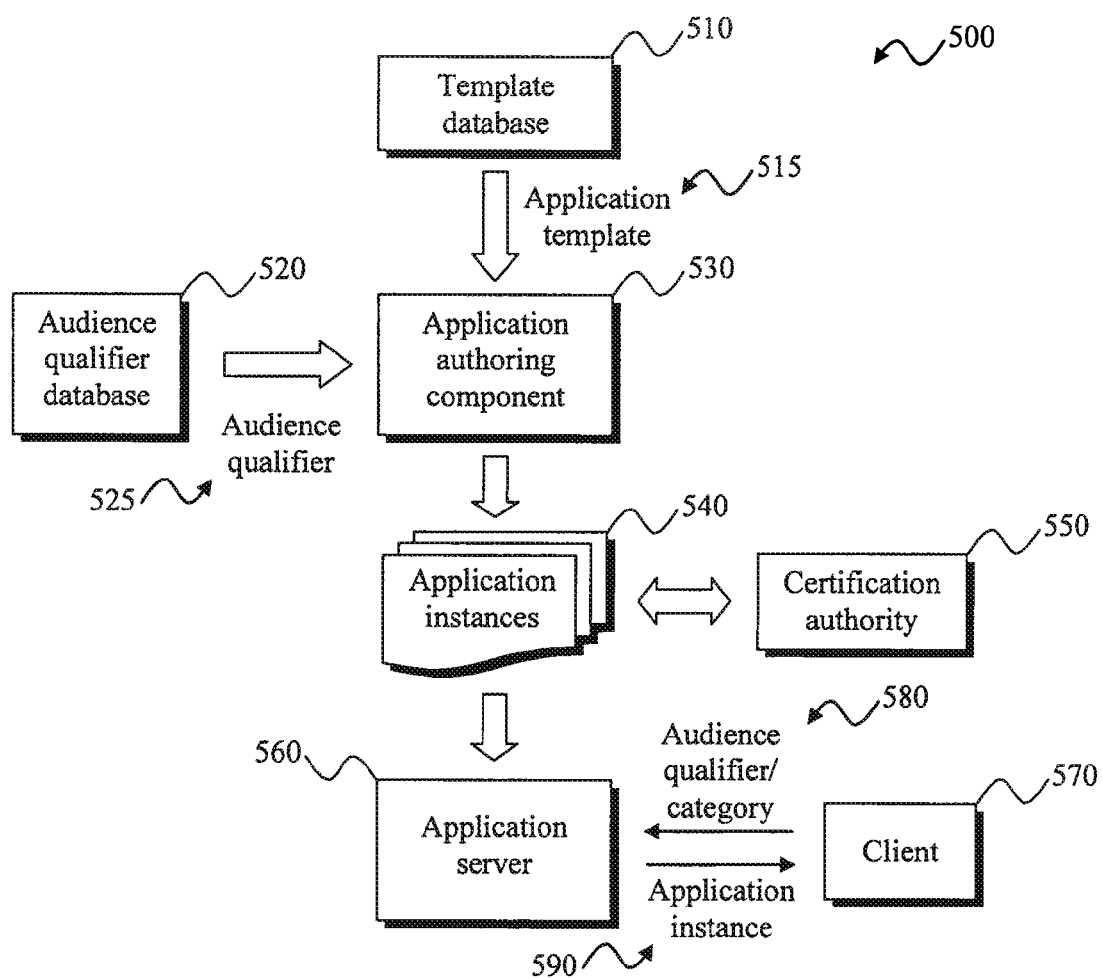
FIG. 5 depicts the components of an exemplary system that implements the inventive method.

According to the teachings of the inventive method, a master application template can be used to create multiple versions of an application. FIG. 5 depicts the components of an exemplary system 500 on which the inventive method may be practiced.

An application database 510 contains one or more master application templates. In the inventive method, a master application template 515 is selected from the template database 510. An audience qualifier database 520 contains definitions for one or more audience qualifiers. An example of an audience qualifier is 'gender'. Each audience qualifier has two or more categories associated with it which describe some or all of the potential users of an application. For example, if the audience qualifier is 'gender', the two categories 'male' and 'female' describe the entire set of potential users. Another example audience qualifier is 'age'. A set of categories for the audience qualifier 'age' may include '6-12', '13-17', '18-25', '26-39', and '40-65', where for each category the numbers represent the minimum and maximum inclusive ages of an age range. In this case, potential application users younger than 6 or older than 65 are not included in the available categories for this qualifier. In the inventive method, an audience qualifier 525 is selected from the audience qualifier database 520. Alternatively, if a suitable audience qualifier 525 is not contained within the audience qualifier database 520, a novel audience qualifier and associated set of categories may be defined within application authoring component 530.

Once a master application template 515 and an audience qualifier 525 have been selected, an application authoring component 530 is used to create an application instance 540 for each category associated with the audience qualifier 525 by modifying at least one attribute of the master application template. For each application instance 540, the number of modifications to the master application template and the values of the modified attributes are determined at least in part by the characteristics of the category associated with the application instance. The set of attributes modified for each application instance may be common to all categories, unique to each category, or common to some and unique to other categories.

Once the application instances 540 are created, the instances may optionally be submitted to a certification authority 550 for certification. If the master application template 515 is certified, the application instances are certified without the requirement for submission to certification authority 550.

Application instances 540 are stored at an application server 560 with application instance metadata defining the audience qualifier and category for each application instance. When a client 570 forwards a request to application server 560 including audience qualifier and category data 580, application server 560 examines application instances 540 and returns an application instance 590 matching the application qualifier and category.

In an exemplary implementation of the inventive system, application instance metadata may be expressed in the form of an XML tag or file encoding the audience qualifier and category. For example, if the audience qualifier is "gender" and the category is "male", the application instance metadata might take the form shown in Table 2:

TABLE 2

Application Instance Metadata

<?xml version="1.0" encoding="utf-8"?>
<audience-qualifier>
   <feature name="gender" category="male"/>
</ audience-qualifier>

An audience qualifier may also be constructed as a combination of singular features. For example, an advertising campaign might wish to distinguish among various audience groups based on a combination of gender and age. An application instance targeted at women between the ages of 25 and 35 might have application instance metadata of the form shown in Table 3:

TABLE 3

Application Instance Metadata

<?xml version="1.0" encoding="utf-8"?>
<audience-qualifier>
   <feature name="gender" category="female"/>
   <feature name="age" category="25-35"/>
</ audience-qualifier>

In an exemplary implementation of the inventive system, application instance metadata might be distributed with an application instance by means of a human-readable XML file that is stored at an application server 560 in association with the storage of the application instance.

Figure 6:
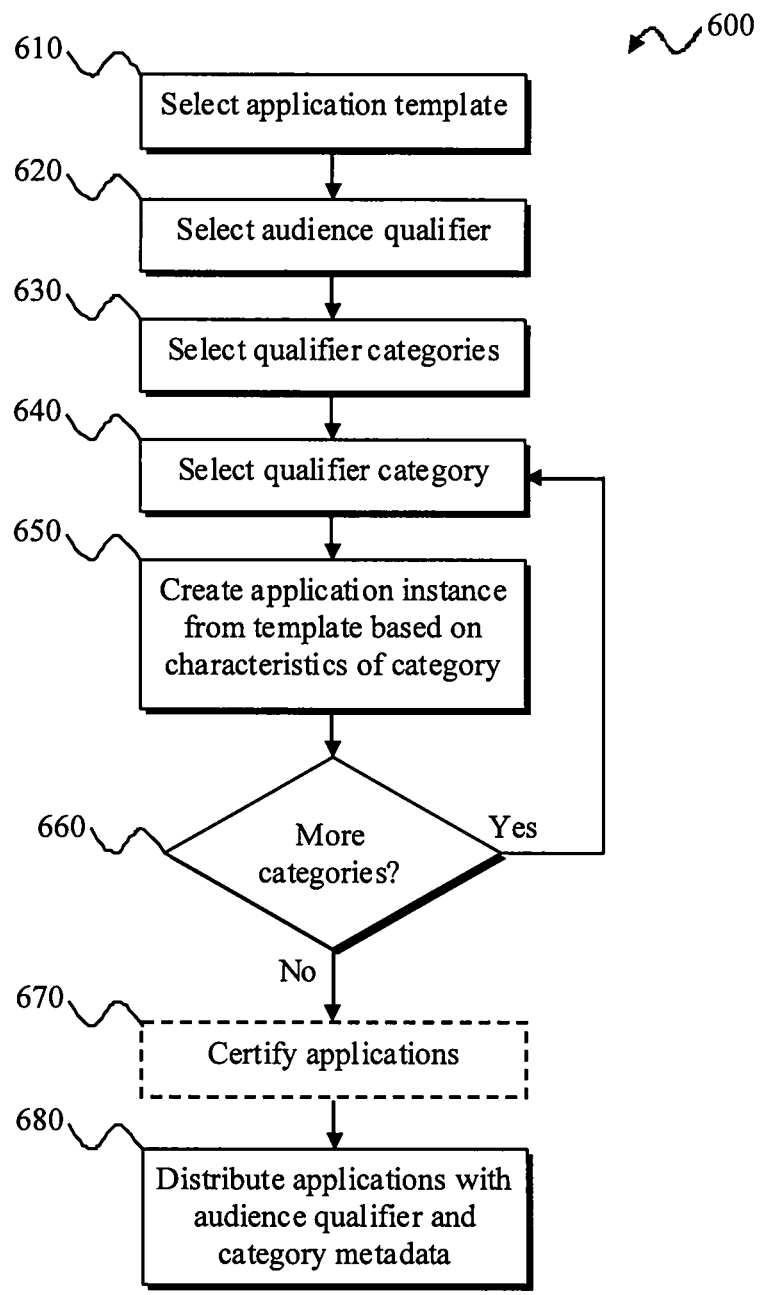
FIG. 6 depicts a flowchart delineating the steps of authoring multiple versions of an application according to the inventive method.

FIG. 6 depicts an exemplary flowchart 600 of the steps of the inventive method for creating a set of applications. At a step 610 a master application template is selected. At a further step 620 an audience qualifier is selected. At a further step 630 a set of two or more categories is selected for the audience qualifier. The set of categories may be comprehensive or may be non-comprehensive.

At a further step 640, a category is selected from the set of categories. At a further step 650, an application instance is created appropriate to the category selected. As described above, creation of an application instance from a master application template may be accomplished by modifying one or more attributes of the master application template. In the inventive method, the selection of the one or more attributes to be modified, and the values assigned to the one or more modified attributes, is based at least in part on the characteristics of the category selected at step 640. Once the one or more attributes modifications have been performed, an application instance is created from the modified master application template.

Once an application instance has been created for the selected category, at a further step 660 a test is made to determine if one or more further categories exist for the audience qualifier selected at step 620. If so, steps 640 and 650 are repeated. If not, at an optional step 670 the application instances are submitted for certification. If certification is not required, or if the master application template selected at step 610 is certified and the modifications to the master application template made at step 650 are in accordance with the constraints specified for the master application template, step 670 need not be performed.

At a further step 680, the application instances created at step 650 are distributed. In a preferred embodiment, the proper application instance is selected based on the metadata associated with the application instance and served to the end user alone. In an alternate embodiment, the application instance is served to the end user together with application instance metadata identifying the audience qualifier and category associated with each application instance.

Figure 7:
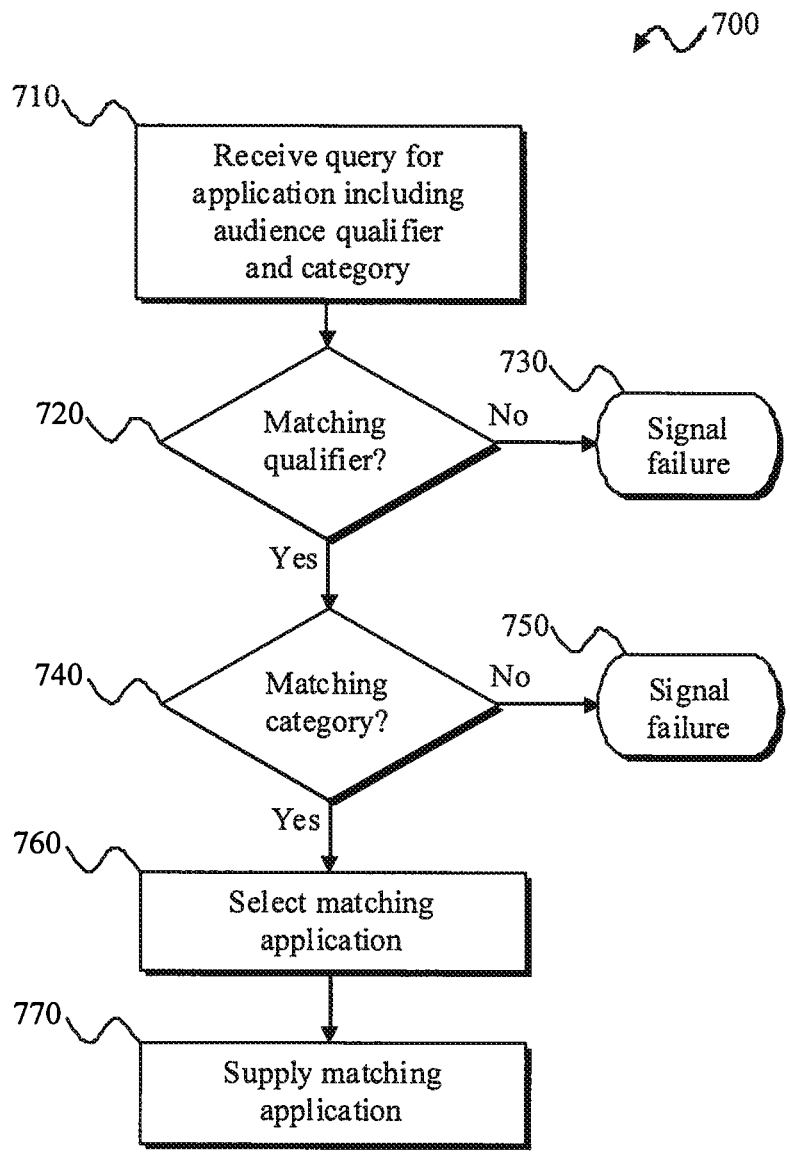
FIG. 7 depicts a flowchart delineating the steps of distributing multiple versions of an application according to the inventive method.

Once a set of applications is created and associated with audience qualifier and category metadata, the applications can be distributed according to the inventive method. FIG. 7 depicts an exemplary flowchart 700 of the steps of a preferential implementation of a method for distributing the applications. In this preferential implementation, application instances and associated metadata are stored at an application server 560. At a step 710, application server 560 receives a request 580 for an application from a client 570. The request includes an audience qualifier and a category associated with the audience qualifier. In the case of an audience qualifier based on a singular feature, the request may name the feature and the category for that feature. In the case of an audience qualifier based on two or more singular features, the request may name each of the two or more singular features and the category for each feature. For example, to request the application instance associated with the application instance metadata depicted in Table 2, the request would name the feature "gender" and the category "male". As a further example, to request the application instance associated with the application instance metadata depicted in Table 3, the request would name the feature "gender" and associated category "female" as well as the feature "age" and associated category "25-35". In the latter example, the full category comprises the two sub-categories "female" and "25-35". The request may be conveyed using a wired or wireless protocol. The message content may be in any suitable human- or machine-readable form.

At a further step 720 a test is made to determine if application server 560 has any application instance with associated metadata matching the audience qualifier specified in request 580. If not, at a further step 730 application server 560 signals failure to client 570 and the process terminates. If application server 560 has one or more application with associated metadata matching the audience qualifier, at a further step 740 a test is made to determine if application server 560 has an application instance with associated metadata matching the application qualifier and the category specified in request 580. If not, at a further step 750 application server 560 signals failure to client 570 and the process terminates. If application server 560 has metadata matching the category, at a further step 760 application server 560 selects a matching application 590. At a further step 770 application server 560 supplies matching application 590 to client 570. The matching application may be supplied using the same wired or wireless protocol used to convey request 580, or through a different wired or wireless protocol. If the set of categories used to create a set of applications is comprehensive, execution of exemplary flowchart 700 will always result in an application being supplied in response to a valid request.

Figure 8:
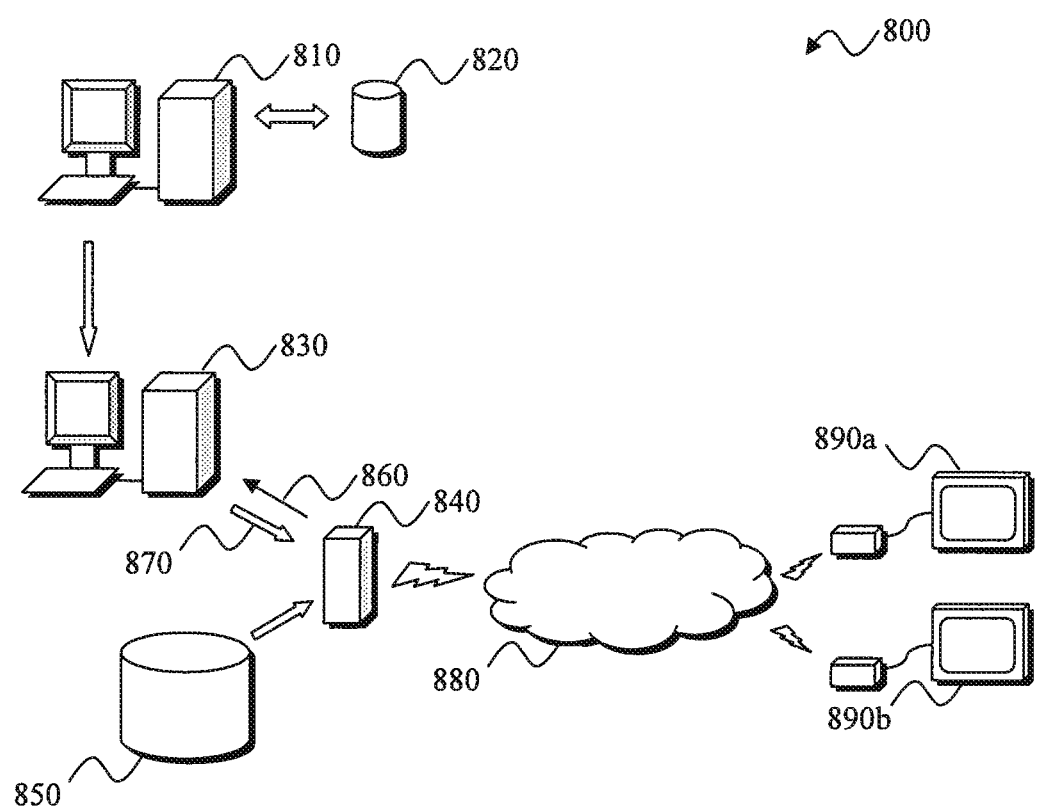
FIG. 8 depicts an exemplary application broadcast system incorporating features of the inventive method and system.

By way of further illustration of the inventive method and system, FIG. 8 depicts elements of an exemplary system 800 incorporating features of a preferred embodiment of the inventive method and system. System 800 is configured to author and deliver interactive television applications in conjunction with an advertising campaign. An advertiser wishes to present a television commercial accompanied by an interactive 'request-for-information' (RFI) application. RFI applications are to be broadcast in conjunction with an associated television commercial, and a user of an RFI application is given an opportunity to request further information about a specific product described and depicted by the application. In an exemplary case, a company produces and wishes to advertise personal hygiene products; for a male viewer, the RFI application will describe and depict a cologne product, whereas for a female viewer, the RFI application will describe and depict a feminine underarm deodorant product. In this application of the inventive method, the selected audience qualifier is 'gender', with the categories 'male' and 'female'. An author uses authoring system 810 to select an RFI master application template from template repository 820. Two versions of the RFI application are created from an RFI master application template. Each of the two application instances generated from the RFI master application template will depict an image and descriptive text corresponding to the image. When the application instances are created, the attribute values for the image resource and descriptive text will reflect the advertiser's intent, with the application instance for the 'male' category depicting a bottle of cologne and describing the scent of the cologne, and the application instance for the 'female' category depicting a can of underarm deodorant spray and describing the antiperspirant properties of the spray. The application instances are stored in an application server 830 with associated metadata defining the audience qualifier and category for each application instance.

When the commercial is to be presented, broadcast delivery system 840 acquires from asset delivery system 850 the audio/video content of the commercial to be broadcast. Broadcast delivery system 840 sends an application request 860 to application server 830 for an RFI application to be broadcast with the commercial. The request may be conveyed over a wired or wireless channel, and may use any standard or custom protocol sufficient for conveying the content of the request, which includes an audience qualifier and a category. If the commercial is being aired on a channel and at a time when the program content is likely to appeal to female viewers, for example on the 'Lifetime' channel during a weekday afternoon, broadcast delivery system 840 may request an application for audience qualifier 'gender' and category 'female'. If the commercial is being aired on a channel and at a time when the program content is likely to appeal to male viewers, for example on the 'ESPN' channel on a weekend afternoon, broadcast delivery system 840 may request an application for audience qualifier 'gender' and category 'male'. The audience qualifier and category data are incorporated into application request 860. In response to application request 860, application server 830 selects an appropriate interactive application instance 870 and delivers it to broadcast delivery system 840. The audio/video content and the interactive application are broadcast through a network 880 to receivers 890a, 890b, where the content may be viewed and the interactive application may be executed.

The features of database, authoring, server and distribution components as described herein may be provided by hardware, software, or a combination of hardware and software. Various components may be incorporated into one or more physical devices, or may be provided as wired or wireless network services. Those skilled in the art will realize that such variations in implementation do not depart from the spirit and scope of the invention. Delivery of content through a network may be accomplished by wired or wireless means, including terrestrial, satellite, cable, and telephone transmission, without departing from the intent of the inventive method and system.

The term "computer" is used herein to refer to any device with processing capability such that it can execute instructions. Those skilled in the art will realize that such processing capabilities are incorporated into many different devices and therefore the term "computer" includes PCs, servers, mobile telephone, personal digital assistants and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

The steps of the methods described herein may be carried out in any suitable order, or simultaneously where appropriate. Aspects of any of the examples described above may be combined with aspects of any of the other examples described to form further examples without losing the effect sought.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. In a computer system providing an application authoring environment, a method of creating and distributing multiple versions of an executable application characterized by:
   selecting an audience qualifier having a plurality of categories within the audience qualifier;
   selecting at least a first one and a second one of the plurality of categories for within the selected audience qualifier;
   in the authoring environment:
      from a master application template comprising an application representation and template metadata, creating for each of the first one and second one of the plurality of categories at least one executable application instance having a specified appearance and behavior, wherein:
         the appearance and behavior of each executable application instance are determined at least in part by characteristics of the associated first one or second one of the plurality of categories; and
         each executable application instance is created by modifying at least one attribute of the master application template within a constraint embodied in the template metadata; and
      associating application instance metadata with each executable application instance specifying the audience qualifier and category corresponding to the executable application instance; and
   distributing each executable application instance in accordance with the associated application instance metadata.

2. The method of claim 1, further characterized by, in the authoring environment, submitting each executable application instance created from the master application template for certification prior to the distribution step.

3. The method of claim 1, further including the step of certifying the master application template prior to creation of the executable application instances, the executable application instances created from the master application template consequently having a certified status, wherein the step of certifying the master application template comprises:
   generating a first executable application from the application representation;
   determining that the first executable application meets all of a set of requirements for certification; and
   determining that modifying each attribute of a plurality of attributes specified in the template metadata in accordance with all requirements for the modification of each attribute does not violate any of the set of requirements for certification.

4. The method of claim 1, further including:
   storing the master application template in a repository of other such master application templates; and
   retrieving the master application template from the repository into the authoring environment.

5. The method of claim 1, wherein the executable application instance created for the first one of the plurality of categories is created using a modified attribute value different from a modified attribute value used for creating the executable application instance created for the second one of the plurality of categories.

6. The method of claim 1, wherein:
   one of the at least one modified attributes is an image resource or descriptive text; and
   the image resource or descriptive text for the executable application instance created for the first one of the plurality of categories is different from the image resource or descriptive text for the executable application instance created for the second one of the plurality of categories.

7. The method of claim 6, wherein the audience qualifier is 'gender' and the first one and second one of the plurality of categories are 'male' and 'female'.

8. The method of claim 6, wherein the audience qualifier is 'age' and the first one and second one of the plurality of categories are different ages ranges.

9. The method of claim 1, wherein the step of modifying the at least one attribute of the master application template comprises assigning a values to the at least one attribute based at least in part on the characteristics of the associated first one or second one of the plurality of categories.

10. A system for creating executable applications wherein the executable applications are associated with a specified audience qualifier and category within the specified audience qualifier, the system comprising:
   a master template retrieval component configured to retrieve master application templates from a master application template repository, each of said master application templates having at least one attribute that acts to regulate the appearance or behavior of executable application instances created from the master application templates and each of the master application templates comprising associated template metadata embodying a constraint associated with the at least one attribute;
   a category selection component operable on the application authoring system and configured to allow an application author to select an audience qualifier and at least two categories within the audience qualifier; and
   an executable application instance creation component configured to select a master application template, create for each of the categories at least one executable application instance from the master application template, wherein the appearance or behavior of the application instance is determined at least in part by characteristics of the associated category, and associate application instance metadata with each executable application instance describing the audience qualifier and category associated with the executable application.

11. The system of claim 10, the master application template including a plurality of attributes, wherein each executable application instance created from the master application template includes at least a changed one of the plurality of attributes of the master application template.

12. The system of claim 10, wherein a value of the at least one attribute of the master application templates for the executable application instance created for a first one of a plurality of categories is different from a value of the at least one attribute of the master application template for the executable application instance created for a second one of the plurality of categories.

13. The system of claim 12, wherein the audience qualifier is 'gender' and the first one and second one of the plurality of categories are 'male' and 'female'.

14. The system of claim 12, wherein the audience qualifier is 'age' and the first one and second one of the plurality of categories are different age ranges.

15. A computer system for application authoring and distribution comprising:

a selection component configured to select an audience qualifier and at least two categories for the audience qualifier;

an authoring component configured to select a master application template comprising an application representation and template metadata, create for each of the categories at least one executable application instance from the master application template, wherein the appearance and behavior of the executable application instance are determined at least in part by characteristics of the associated category and the executable application instance is created by modifying at least one attribute of the master application within a constraint embodiment in the template metadata, and associate application instance metadata with each executable application instance specifying the audience qualifier and category corresponding to the executable application instance; and a distribution component configured to distribute the executable application instances in accordance with associated application instance metadata.

16. The system of claim 15, wherein the authoring component is further configured to submit each executable application instance for certification.

17. The system of claim 16, wherein the master application template is a certified master application template and each executable application instance is certified by virtue of the certification of the certified master application template.

* * * * *